V. H. GODILLON.
STABILIZING APPARATUS FOR SIGHTING INSTRUMENTS.
APPLICATION FILED DEC. 22, 1919.

1,393,437.

Patented Oct. 11, 1921.
16 SHEETS—SHEET 1.

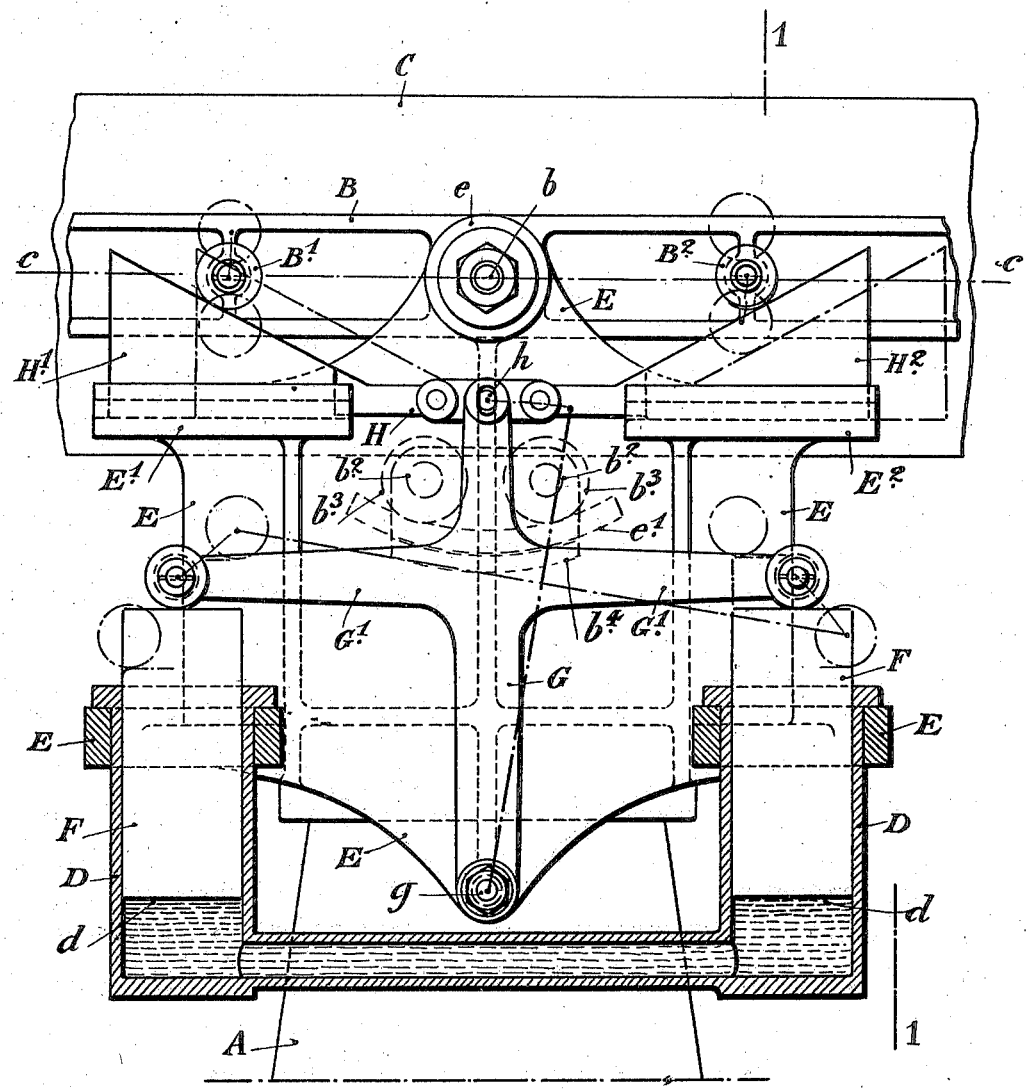

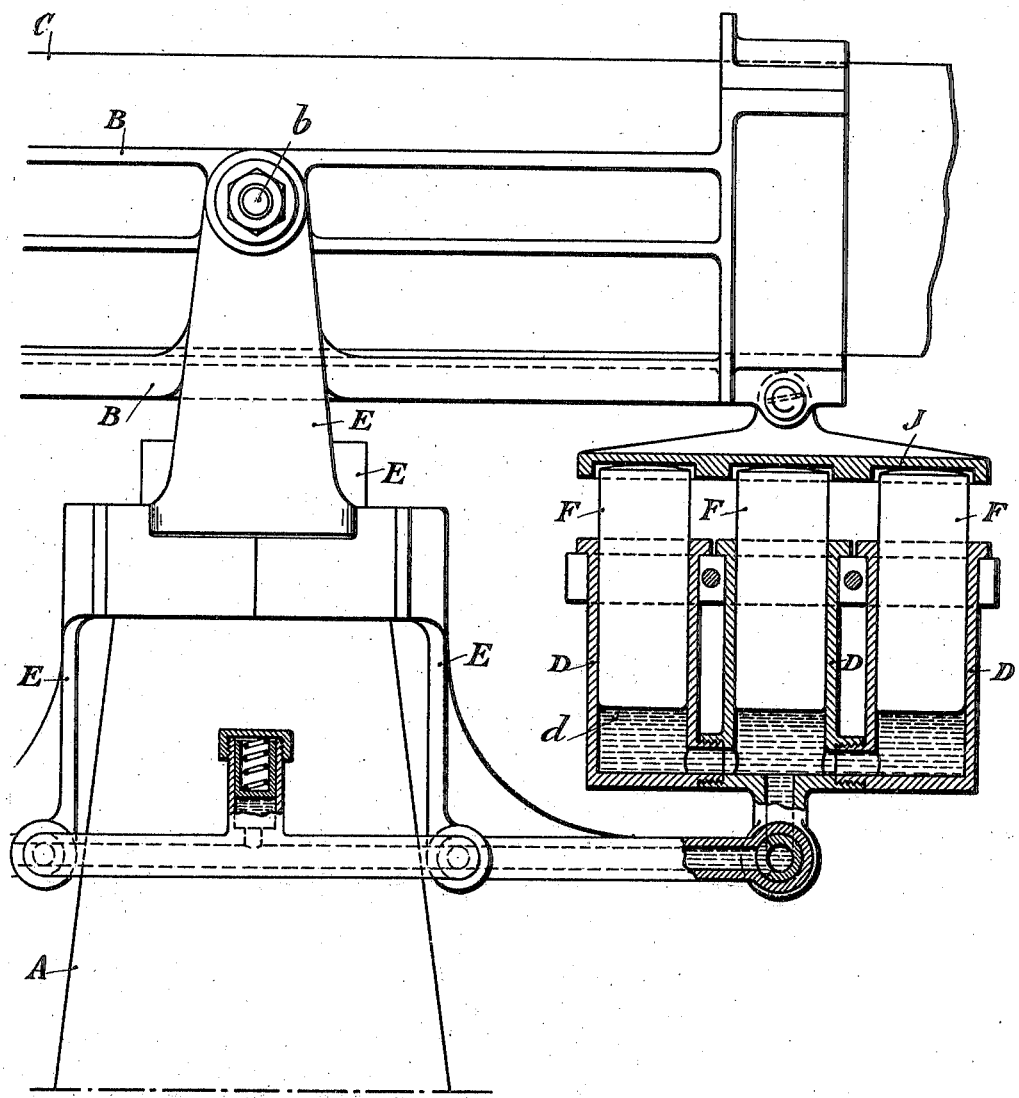

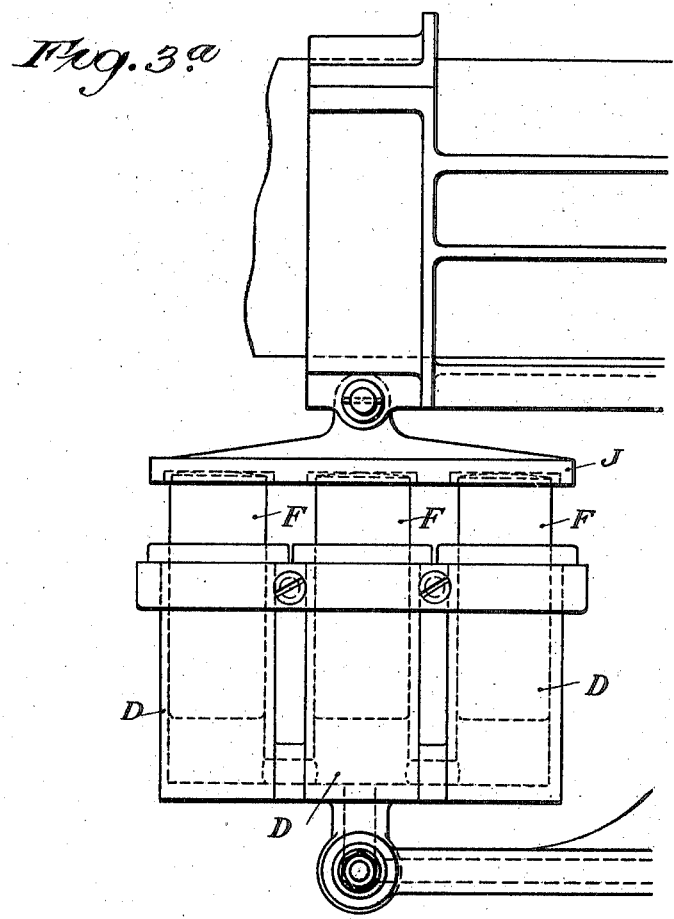

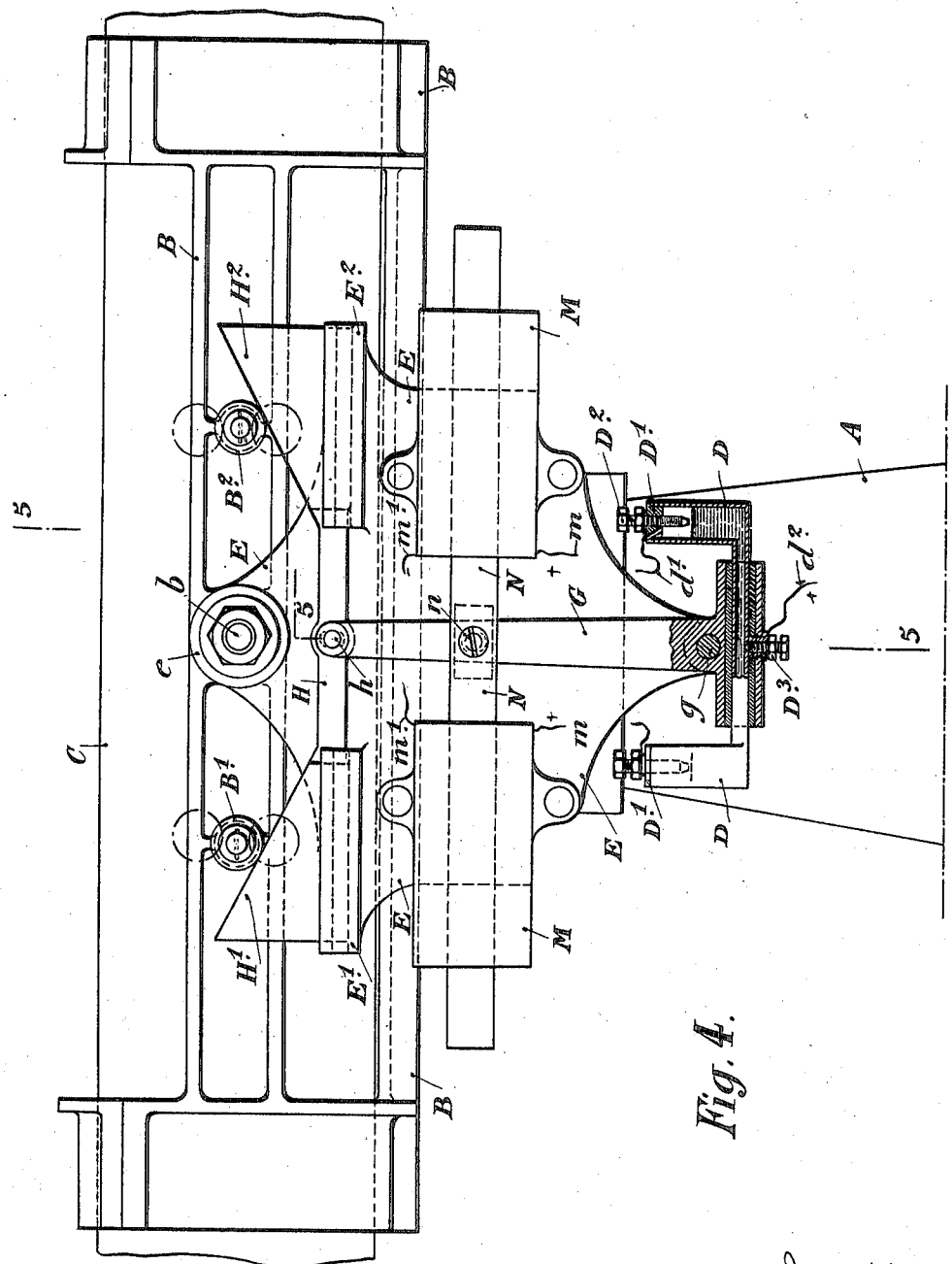

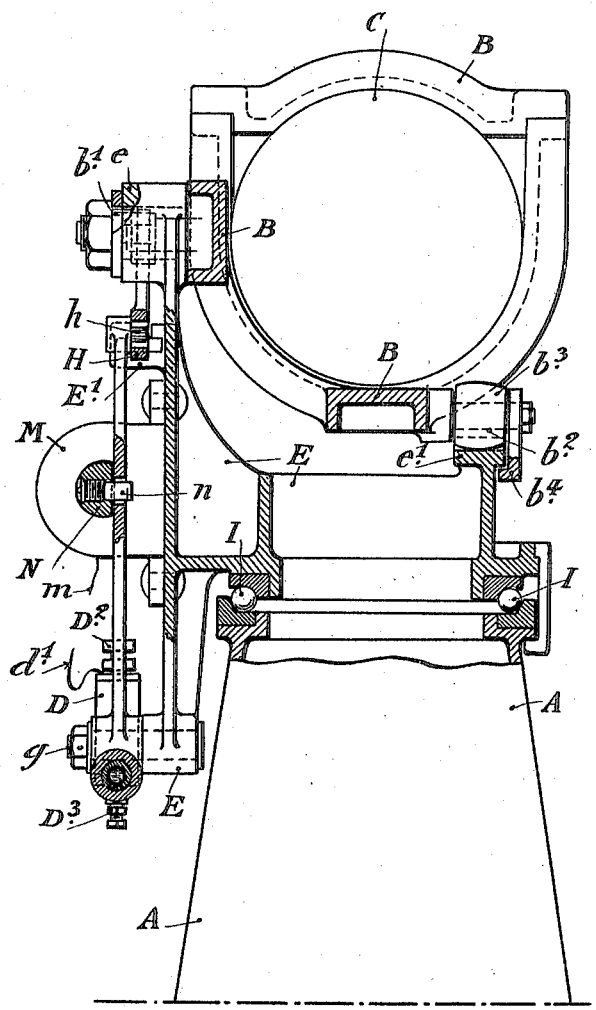

V. H. GODILLON.
STABILIZING APPARATUS FOR SIGHTING INSTRUMENTS.
APPLICATION FILED DEC. 22, 1919.

1,393,437.

Patented Oct. 11, 1921.

Inventor:-
Victor Honoré Godillon,
By Mauro, Cameron, Lewis & Kerkam
Attorney.

V. H. GODILLON.
STABILIZING APPARATUS FOR SIGHTING INSTRUMENTS.
APPLICATION FILED DEC. 22, 1919.

1,393,437.

Patented Oct. 11, 1921.
16 SHEETS—SHEET 10.

V. H. GODILLON.
STABILIZING APPARATUS FOR SIGHTING INSTRUMENTS.
APPLICATION FILED DEC. 22, 1919.

1,393,437.

Patented Oct. 11, 1921.
16 SHEETS—SHEET 12.

V. H. GODILLON.
STABILIZING APPARATUS FOR SIGHTING INSTRUMENTS.
APPLICATION FILED DEC. 22, 1919.
1,393,437.
Patented Oct. 11, 1921.
16 SHEETS—SHEET 13.
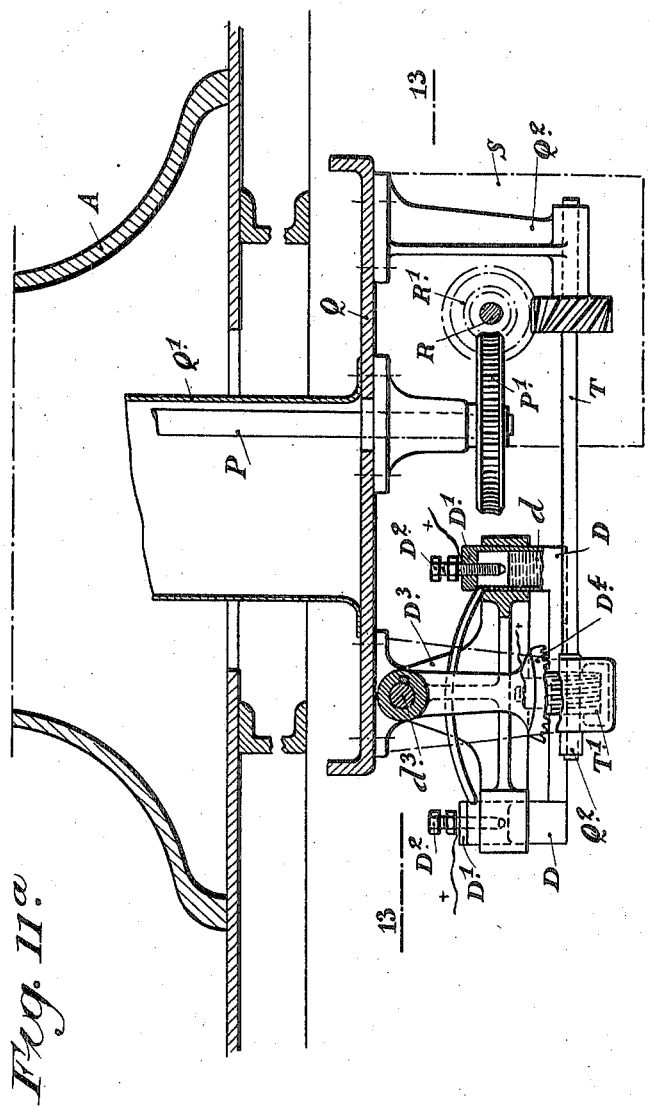

V. H. GODILLON.
STABILIZING APPARATUS FOR SIGHTING INSTRUMENTS.
APPLICATION FILED DEC. 22, 1919.

1,393,437.

Patented Oct. 11, 1921.
16 SHEETS—SHEET 14.

Inventor:-
Victor Honoré Godillon,
By Mauro, Cameron, Lewis & Kerkam
Attorneys.

V. H. GODILLON.
STABILIZING APPARATUS FOR SIGHTING INSTRUMENTS.
APPLICATION FILED DEC. 22, 1919.

1,393,437.

Patented Oct. 11, 1921.
16 SHEETS—SHEET 15.

V. H. GODILLON.
STABILIZING APPARATUS FOR SIGHTING INSTRUMENTS.
APPLICATION FILED DEC. 22, 1919.

1,393,437.

Patented Oct. 11, 1921.
16 SHEETS—SHEET 16.

UNITED STATES PATENT OFFICE.

VICTOR HONORÉ GODILLON, OF PARIS, FRANCE, ASSIGNOR TO SOCIÉTÉ D'OPTIQUE ET DE MECANIQUE DE HAUTE PRÉCISION, OF PARIS, FRANCE, A JOINT-STOCK COMPANY.

STABILIZING APPARATUS FOR SIGHTING INSTRUMENTS.

1,393,437.   Specification of Letters Patent.   Patented Oct. 11, 1921.

Application filed December 22, 1919. Serial No. 346,589.

*To all whom it may concern:*

Be it known that I, VICTOR HONORÉ GODILLON, a citizen of France, and a resident of Paris, France, have invented new and useful Improvements in Stabilizing Apparatus for Sighting Instruments, which invention is fully set forth in the following specification.

This invention has for its object to provide an improved automatic corrector for assuring automatically the horizontality or the fixity of inclination of an indicating device, such as apparatus for sighting or measuring, mounted on a platform that is subject to being deflected from the horizontal, as for instance the bridge or deck of a ship.

This invention is particularly applicable to range-finders or apparatus for sighting on board ship or guns of position.

According to this invention the apparatus which is to be kept automatically in a horizontal position or at an inclination at a given angle, is mounted on a support that is capable of rocking on an axis and is constantly subject to the action of uprighting devices controlled by the motion of a mercury bath contained in a tank mounted on the foot or support proper of the apparatus, fixed to the platform that is subject to the deviations from the horizontal. The action of the mercury bath upon the rocking support carrying the sighting or measuring apparatus, may be produced mechanically by floats for instance, or electrically by means of alternate makes and breaks of an electric circuit that produces movements corresponding to the deviations from the horizontal or from a given inclination, by the bringing of suitable devices into operation.

Various constructional forms of this invention are illustrated by way of example in the accompanying drawings in which:—

Figures 1 and 2 are respectively a cross section on the line 1—1 of Fig. 2 and a vertical longitudinal section on the line 2—2 of Fig. 1, of a first constructional form of this invention designed for correcting automatically the deviations of a range finder on board ship.

Fig. 3 is a side elevation, partly in section, of a modification of the device.

Fig. 4 is a side elevation, partly in section, of a third constructional form of the invention.

Fig. 5 is a section on the line V—V of Fig. 4.

Fig. 15 is a diagram of the electrical connections.

Figure 1:
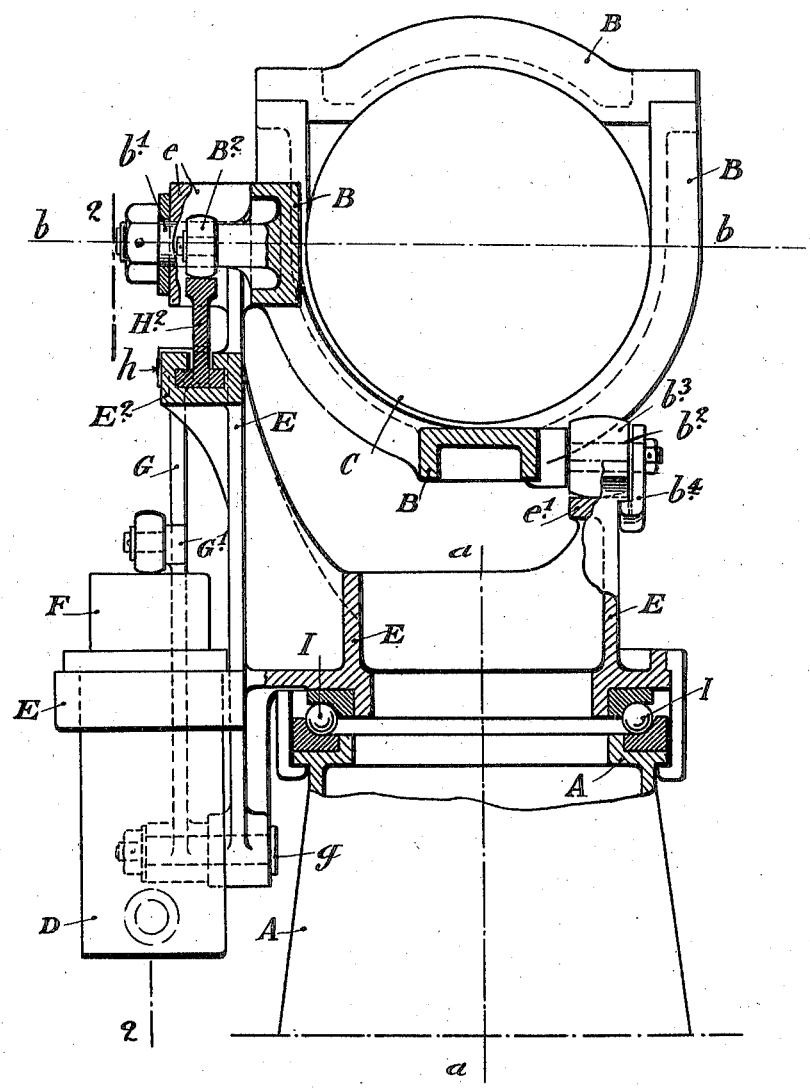
Figure 14:
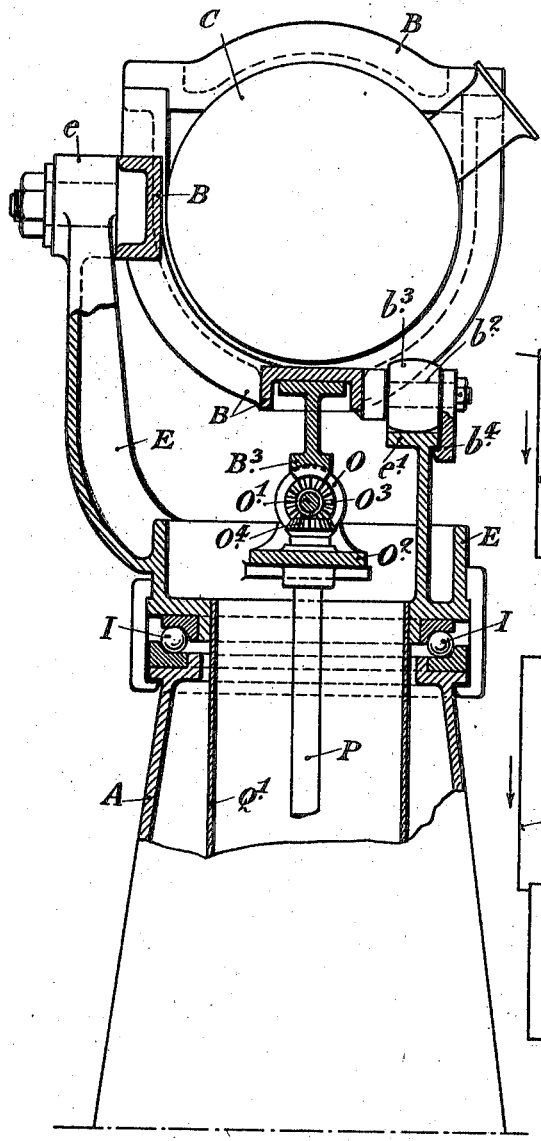
Fig. 14 is a vertical cross-section on the line XIV—XIV of Fig. 11.

In Figs. 1 and 2, C is the body of a monostatic range-finder mounted in the usual manner in a support or carrier B in which it is able to rotate on its longitudinal axis $c$—$c$ for the purpose of shifting the objectives in a vertical plane.

The support B instead of pivoting directly on the foot A of the apparatus, is constructed according to the present invention in such a manner as to be able to rock on a geometric axis $b$—$b$ at right angles to the longitudinal axis $c$—$c$ of the apparatus on an intermediate support E which is arranged to pivot around the vertical axis $a$—$a$ of the foot A.

For the sake of clearness of the descriptions hereinafter given, the direct support B of the apparatus C will be referred to as the rocking support or rockable carrier; the intermediate support E will be referred to as the pivoting support; and the foot A which is fixed on the platform subjected to the deviations from the horizontal, will be referred to as the fixed support.

The stability of the apparatus C, that is to say, in the present case, the maintenance of the horizontality of the axis $c$—$c$ is assured by the action, upon the rocking support B of devices that are influenced by a mercury level.

In this first example this level comprises a tank D in the form of inter-communicating vessels fixed to the pivoting support E, and therefore subjected to the deviations from the horizontal imparted to the fixed support A. The plane of the longitudinal axis of the mercury level is parallel to the plane of the rocking motion of the range finder C.

The rocking of the support B on the geometric axis $b$—$b$ is insured by means of a trunnion $b^1$ formed on B, and for which a bearing $e$ is provided in the pivoting support E. The support B comprises also two axle pins $b^2$ fitted with rollers $b^3$ rolling on a circular track $e^1$ having its center on $b$—$b$. A catch $b^4$ by engaging the circular track $e^1$ prevents any rising movement of the rocking structure.

The uprighting mechanism comprises plungers F working in the mercury level vessels. These plungers act upon arms $G^1$ $G^1$ that constitute the beam of a lever G fulcrumed at $g$ on the pivoting support E. The upper end of the lever G is engaged in a guide slot of a pin $h$ projecting from a slider H. The latter terminates at its ends in two ramps or cams $H^1$, $H^2$ guided by ribs in corresponding guides $E^1$ $E^2$ formed on the support E. Rollers $B^1$ $B^2$ mounted on axle pins projecting from the rocking support B bear respectively upon the cams $H^1$ $H^2$.

The pivotal motion of the support E on the foot A is produced by any suitable known means such as for instance a ring of balls I running in races provided in E and A.

The result of an inclination of the platform carrying the foot A is to carry with it the pivoting support E and also the tank D carried by the latter. Since the mercury level $d$ remains horizontal, the result will be a displacement of one of the two plungers F, and consequently a thrust by the latter upon the corresponding arm of the beam $G^1$—$G^1$. The combination $G^1$—$G$—$G^1$ will then assume in relation to the foot A which has become inclined, for instance the position indicated by dot and dash lines.

The angular displacement G causes a corresponding displacement of the slider $H^1$ $H$—$H^2$ in its guides. The cam $H^1$ has a tendency to cause the roller $B^1$ to rise, whereas the roller $B^2$ is lowered by contact with the cam $H^2$. Consequently the support B is maintained at all times horizontal, whatever the inclination the combination D—E—A may have.

It is to be noted that owing to the irreversibility of the cams $H^1$ $H^2$ the support B, and consequently also the range finder C cannot be deviated from the horizontal by any accidental cause whatever.

Fig. 3 is a side elevation partly in section along the axis of one of the intercommunicating vessels of the mercury level, of a modification of the constructional form just hereinbefore described.

In this modification a plurality of plungers F arranged in each of the vessels of the tank D act upon plates J jointed to the ends of the rocking support B. By this means a tilting thrust of suitable power is produced upon the said plates.

Figure 6:
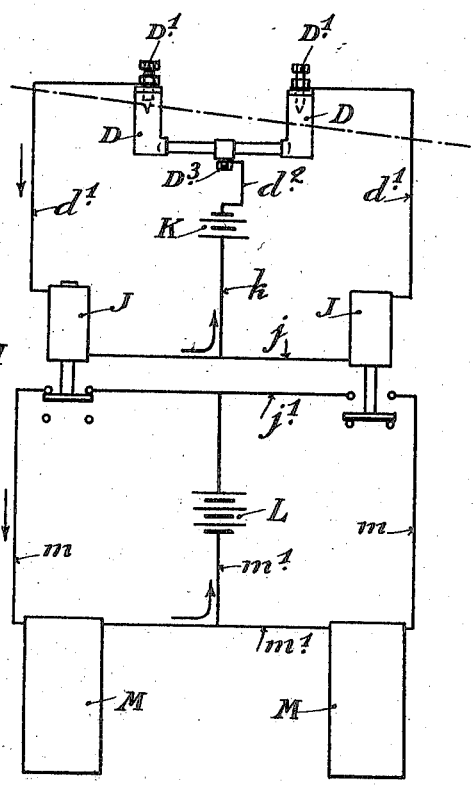
Fig. 6 is a diagram of the electrical connections.
Figure 7:
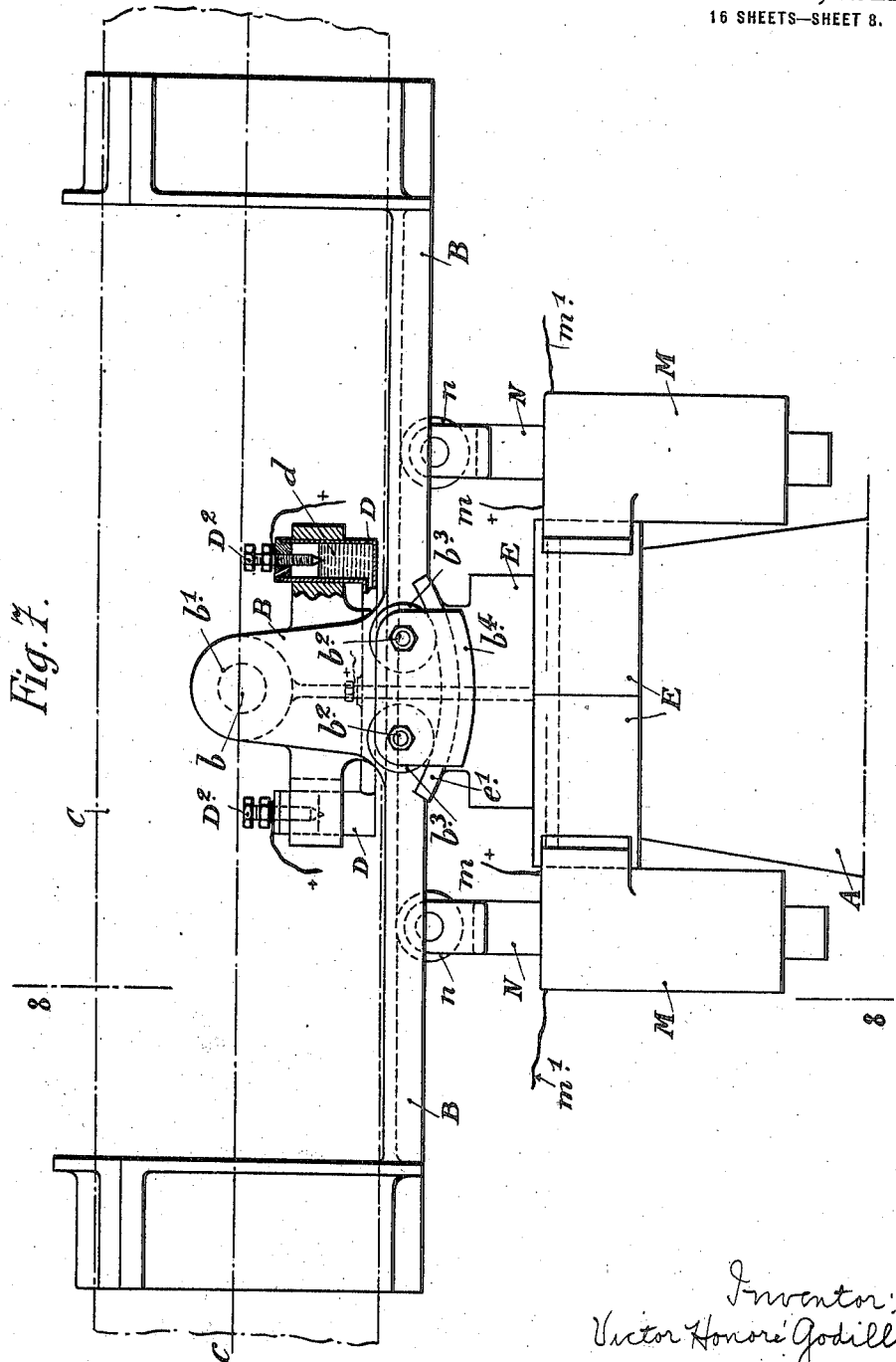
Fig. 7 is a side elevation, partly in section, of a fourth constructional form of the device.
Figure 8:
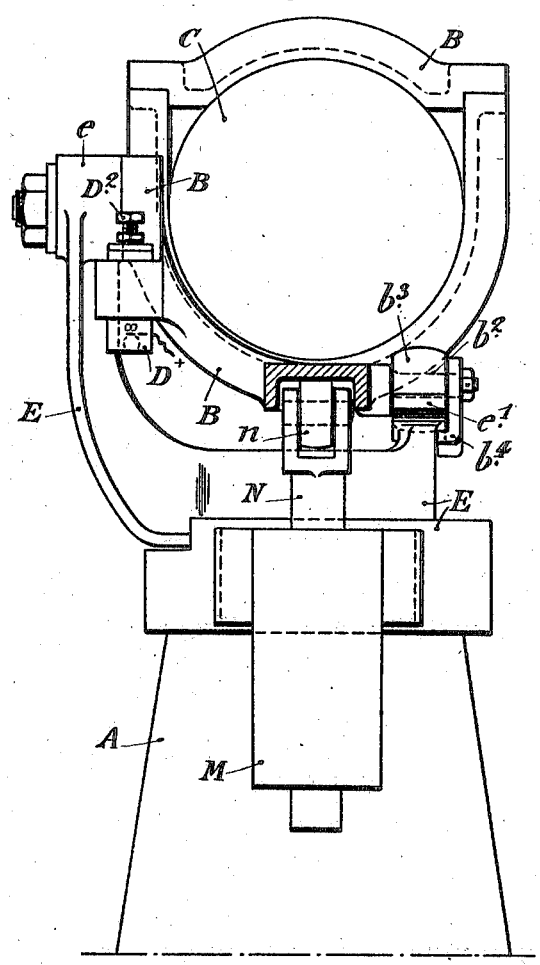
Fig. 8 is a sectional view on the line VIII—VIII of Fig. 7.
Figure 9:
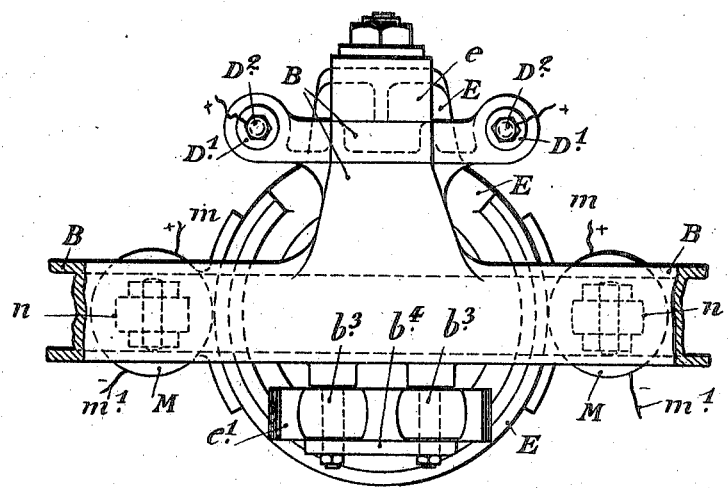
Fig. 9 is a plan of the same.

In the example shown in Figs. 4, 5 and 6 the action of the mercury bath upon the rocking support is produced by means of electricity.

In this example the parts of the constructional example shown in Figs. 1 and 2 are provided with the same letters of reference. The tank D is carried by a lever G similar to the lever in that example.

Each of the vessels of the level is closed by an insulating plug $D^1$ pierced with an air hole and traversed by a screw $D^2$. The stem of the screw is connected by a wire $d^1$ to a relay J (Fig. 6). The relays J are connected to one another by a wire $j$ which is in turn connected by a wire $k$ to one of the terminals of a battery K of low voltage, the other terminal being connected by a wire $d^2$ to a terminal $D^3$ provided on the communicating conduit between the two vessels, for the purpose of transmitting the current to the mercury.

Each relay J acts to close by means of the wires $j^1$ and $m$, the circuit ending at one of the terminals of a high voltage battery L through an electromagnet M which is itself connected directly to the other terminal of the battery by means of a wire $m^1$. The windings of the electromagnets M are fixed to the pivoting support E; and their cores are constituted by two bars N, N, extending in continuous line with each other; the middle of the continuous bar being provided with a pin $n$ engaged in a guide slot of the lever G.

If the platform carrying the combination A—E—D should become inclined, the tank D will first become inclined with the said combination, the mercury level remaining horizontal; and one of the screws $D^2$ entering the bath thereby closing the electric circuit (which is normally open) through the relay J and the corresponding electromagnet M. The result is a displacement of the core N which moves by means of the lever G; the slider H and the tank D. The operation of this slider and of the cams $H^1$, $H^2$ carried by it, is the same as in the example shown in Figs. 1 and 2. The tank D moved by the motion of the core N and the lever G, resumes its initial position, thereby interrupting afresh the current in the relay J and in the electromagnet M at the moment when the apparatus c is horizontal.

In the example shown in Figs. 7 to 10 the tank D of the mercury level is fixed to the rocking support B. Normally, that is to say, when the axis $c$—$c$ of the apparatus C is horizontal, the two screws $D^2$ are slightly immersed at their ends in the mercury $d$. The rocking support B rests by means of a rib of inverted U shape, on rollers $n$ carried by the cores N of the electromagnets whose windings M are fixed to the pivoting support E. The jointing and the guiding of B on E are arranged as in the example shown in Figs. 1 and 2.

Figure 10:
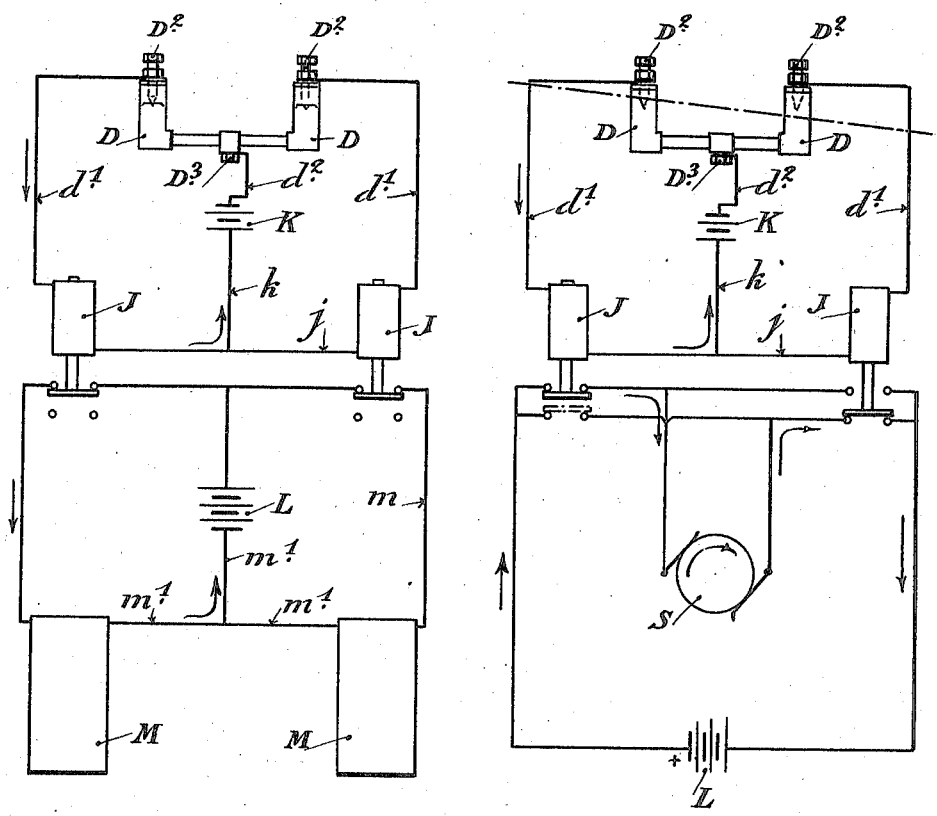
Fig. 10 is a diagram of the electrical connections.
Figure 11:
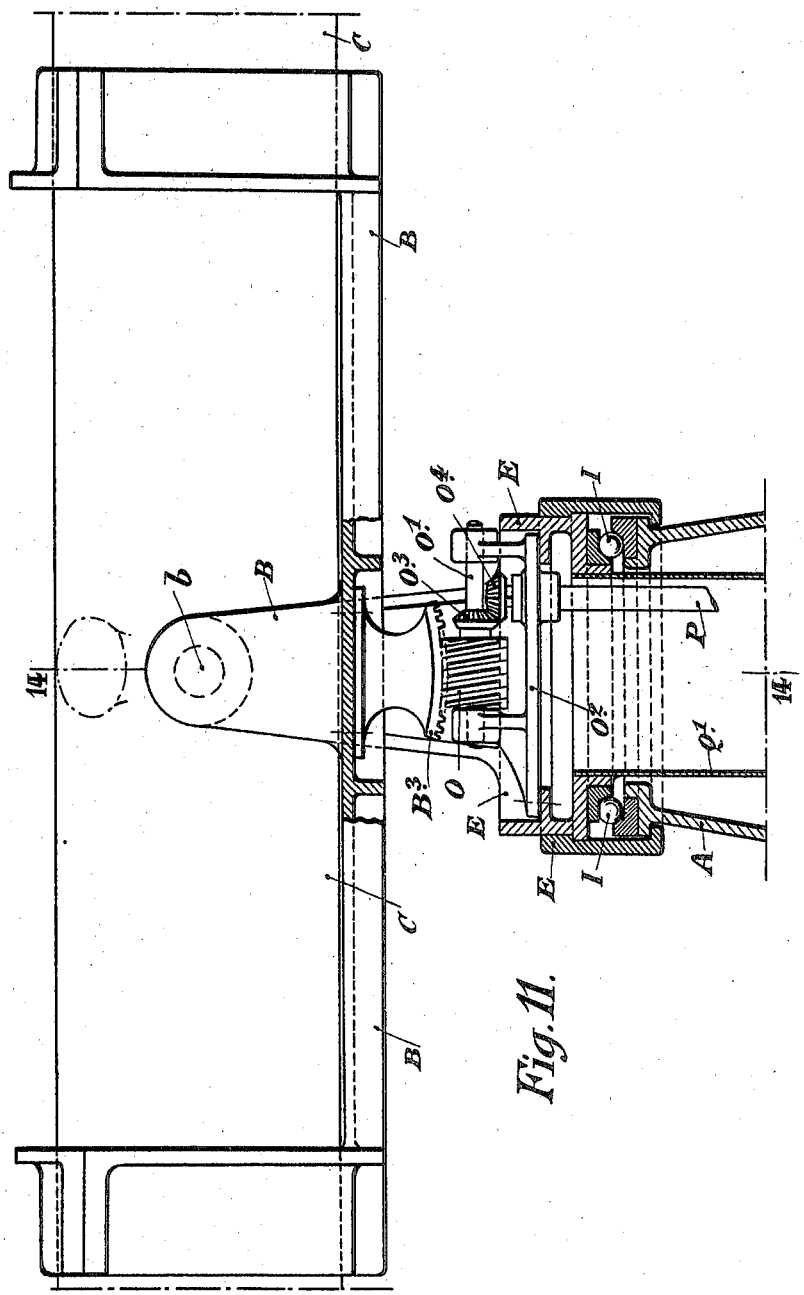
Fig. 11 is a longitudinal vertical section of a fifth constructional form of the device.
Figure 12:
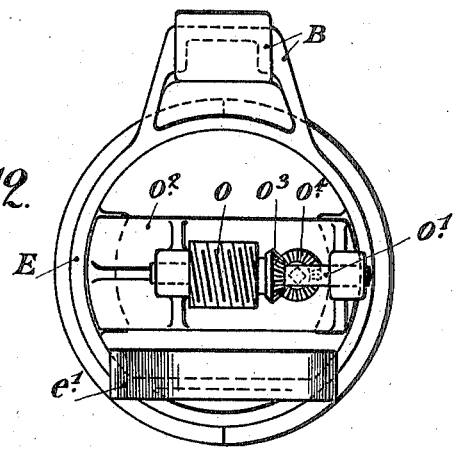
Fig. 12 is a plan of the pivoting support.
Figure 13:
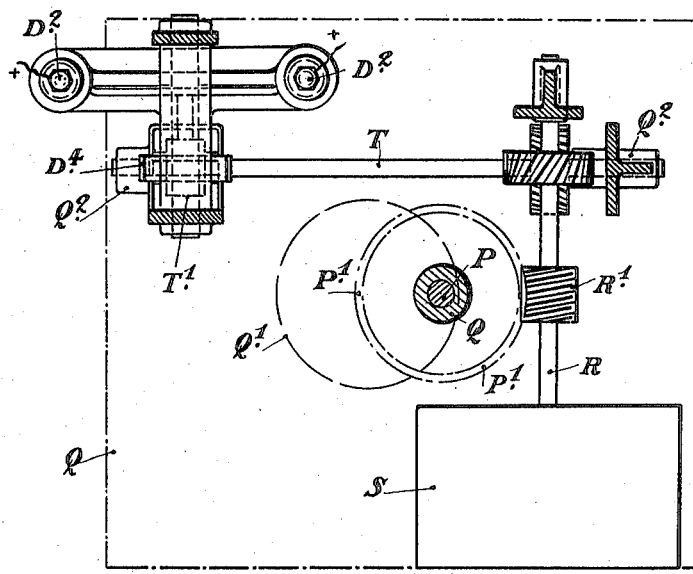
Fig. 13 is a horizontal section on the line XIII—XIII of Fig. 11.

As shown in diagram in Fig. 10 the circuits are normally closed through the electromagnets M by means of the relays J. Consequently, normally the cores N occupy a position in which they prevent any rocking of the support B and of the apparatus C.

If the platform to which the foot A is attached, should happen to deviate from the horizontal, the mercury level tank D will have a tendency to rock with the support B, so that the mercury level descending relatively to one of the screws $D^2$, will immediately open the circuit through the relay J and the corresponding electromagnet M. The result is an immediate lowering of the core N—$n$; and the apparatus being raised by the other core, will assume an inclination in the opposite direction until it resumes its horizontal position at the moment when the screw, having become free, is immersed anew in the mercury.

The closings and openings of an electric circuit produced by the relative movements between the tank D and the mercury, instead of producing an action upon the body of the apparatus C or upon its support B, by the displacement of electromagnet cores, may effect the starting of an electric motor that is connected by suitable transmission to the support B.

In the example shown in Figs. 11 to 15 the rocking support B is provided with a helically toothed sector $B^3$ having its center on the rocking axis $b$—$b$ and meshing with a worm O mounted on a shaft $O^1$ that is journaled in bearings provided on a plate $O^2$ fixed to the pivoting support E. On the shaft $O^1$ there is fixed a bevel pinion $O^3$ meshing with a pinion $O^4$ fixed on a shaft P that is normally vertical. This shaft is journaled in the plate $O^2$ and in a plate Q connected to the pivoting support E by means of a rigid sleeve $Q^1$; it carries at its lower end a worm wheel $P^1$ meshing with a worm $R^1$ fixed on a shaft R that is driven by an electric motor S fixed on the plate Q. The mercury level tank D is journaled on an axle $d^3$ mounted in a bracket $D^3$ attached to the underside of this plate Q. The axle $d^3$ is parellel to the rocking axis $b$—$b$ of the support B. The bracket $D^3$ carries a worm wheel sector $D^4$ meshing with a worm $T^1$ fixed on a shaft T that is journaled in brackets $Q^2$ carried by the plate Q.

As shown in Fig. 15, the motor S is connected to the relays J which are connected in their turn to the screws $D^2$ of the mercury level. Normally, the circuit is open in the motor S, the same as in the case of the relays F; the screws $D^2$ being out of contact with the mercury bath.

If the platform carrying the foot A should happen to deviate from the horizontal, the mercury comes into contact with one of the screws $D^2$ and closes the circuit through the corresponding relay (left hand relay in the example shown in Fig. 15). This relay closes in its turn the circuit through the motor S whose shaft being actuated in the desired direction, causes through the described transmissions, the wheel $P^1$ to rotate and also the sector $D^4$ to rotate. The rotation of the wheel $P^1$ produces an immediate uprighting of the support B and of the apparatus C by means of the transmission P—$O^4$—$O^3$—O—$B^3$. At the same time the tank D is uprighted through the same angle, and moves the screw $D^2$ out of contact with the bath, so that the motor is again cut out of circuit as soon as the apparatus has resumed its horizontal position.

Figure 16:
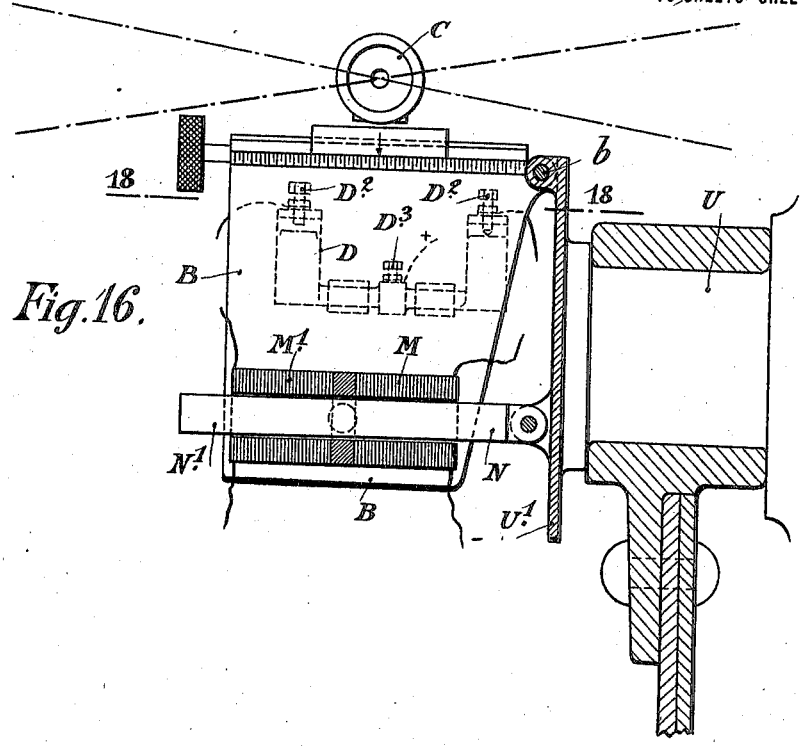
Fig. 16 is a side elevation of a sixth constructional form of the device.
Figure 18:
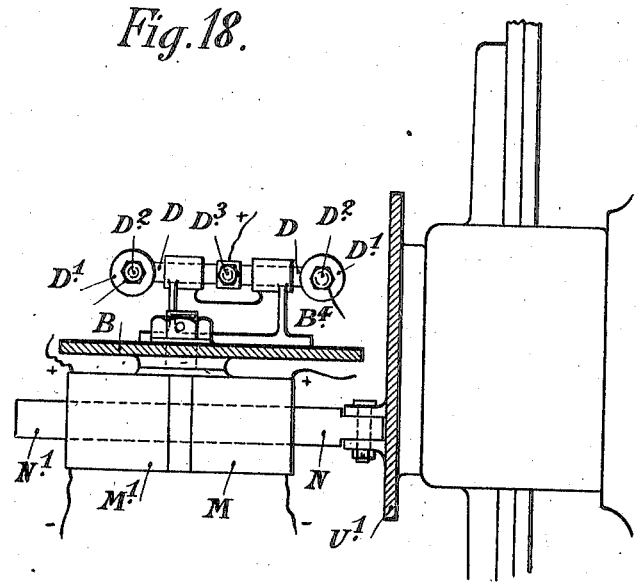
Fig. 18 is a horizontal section on the line XVIII—XVIII of Fig. 16.
Figure 17:
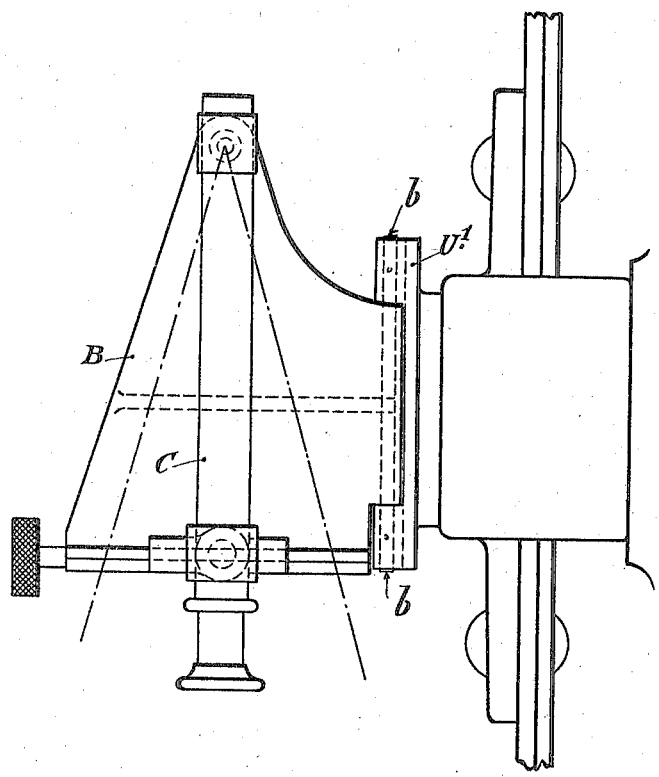
Fig. 17 is a plan view of the same.

Figs. 16, 17 and 18 show an application of this invention to the stabilization of a sighting apparatus for guns on board ship or guns of position.

In these figures, U is one of the trunnions of a gun carrying a plate $U^1$ to which there is jointed on an axis $b$—$b$ the rocking support B which carries a sighting apparatus, such as a telescope C for instance. The improved corrector in this application is designed to maintain automatically the sighting apparatus C in the position that has been imparted to it for aiming notwithstanding any transverse inclination of the axis of the trunnions of the gun.

The improved apparatus comprises as in the preceding examples, a mercury level device D. This level is attached to the rocking support B by means of a bracket $B^4$. The screws $D^2$ arranged as in the example shown in Figs. 7 to 10, are normally immersed slightly in the mercury bath. The said screws are, as indicated in the diagrammatic Fig. 10, connected to relays J that are in their turn connected to electromagnets M, $M^1$. In this case the windings M, $M^1$ of the two electromagnets are mounted on a core $N^1$—N jointed to the plate $U^1$.

If a transverse inclination of the axis of the trunnions U of the cradle or of the gun, should occur, the support B will tend to incline with the apparatus C and in the same direction as the apparatus C. One of the screws D² will cease to dip into mercury. The result will be to open the circuit of the corresponding electromagnet, and consequently produce an attraction of the core by the other electromagnet; this attraction having for effect to produce a rocking movement in the reverse direction of the support B until the apparatus C has resumed its initial position. At this moment the screw D² being released, will dip again into the mercury bath, and the circuit which was momentarily open, is closed again.

In the case where there are mounted on a common platform a plurality of measuring apparatus sighting apparatus or other similar apparatus of which it is desired to assure their stability of position relatively to the horizontal notwithstanding transverse inclination of the platform, it is not necessary to provide each of those apparatus with a complete corrector. A single electric motor connected to one of these apparatus as described in the constructional form shown in Figs. 11 to 15 is capable of transmitting the correcting movement to the whole of the apparatus to be stabilized.

What I claim is:

1. In stabilizing apparatus for sighting instruments mounted on unstable objects, a support fixed to the unstable object, a rockable carrier for the sighting instrument mounted on said support, a tank containing mercury mounted on said support to assume the deviations of the unstable object, the mercury being free to flow to its normal level during the deviations of the tank, and means controlled by the movement of the mercury during deviations of the unstable object for moving the rockable carrier to return the sighting instrument to its initial horizontal position when displaced from the same by deviation of the unstable object.

2. In stabilizing apparatus for sighting instruments mounted on unstable objects, a support comprising a member fixed to the unstable object and an intermediate member pivotally mounted on the fixed member, a rockable carrier for the sighting instrument mounted on the intermediate member, a tank containing mercury mounted on said support to assume the deviations of the unstable object, the mercury being free to flow to its normal level during the deviations of the tank, and means controlled by the movement of the mercury during deviations of the unstable object for moving the rockable carrier to return the sighting instrument to its initial horizontal position when displaced from the same by deviation of the unstable object.

3. In stabilizing apparatus for sighting instruments mounted on unstable objects, a support comprising a member fixed to the unstable object and an intermediate member pivotally mounted on the fixed member, a rockable carrier for the sighting instrument mounted on the intermediate member so that the turning of the latter will change the direction of the carrier and the sighting instrument, a tank containing mercury mounted on the intermediate member to assume the deviations of the unstable object, the mercury being free to flow to its normal level during the deviations of the tank, and means mounted on the apparatus controlled by the movement of the mercury during deviations of the unstable object for moving the rockable carrier to return the sighting instrument to its initial horizontal position when displaced from the same by deviation of the unstable object.

4. In stabilizing apparatus for sighting instruments mounted on unstable objects, an upright support comprising a foot fixed to the unstable object and an intermediate member pivotally mounted on the foot to rotate about a vertical axis, a rockable carrier for the sighting instrument pivoted on a horizontal axis to the intermediate member, the rotation of the intermediate member on its vertical axis changing the horizontal direction of the carrier and the sighting instrument, a tank containing mercury mounted on the intermediate support to assume the deviations of the unstable object, the mercury being free to flow to its normal level during the deviations of the tank, and means mounted on the apparatus controlled by the movement of the mercury during deviations of the unstable object for moving the rockable carrier on its horizontal axis to return the sighting instrument to its initial horizontal position when displaced from the same by deviation of the unstable object.

5. In stabilizing apparatus for sighting instruments mounted on unstable objects, a support comprising a member fixed to the unstable object and an intermediate member pivotally mounted on the fixed member, a rockable carrier for the sighting instrument pivoted on a horizontal axis to the intermediate member, the turning of the intermediate member on the fixed member changing the direction of the carrier and the sighting instrument, an elongated tank containing mercury mounted on the apparatus to assume the deviations of the unstable object with the longitudinal axis of the tank extending in the same direction as the longitudinal axis of the carrier and the mercury free to flow to its normal level from one end of the tank to the other, mechanism mounted on the apparatus for turning the carrier on its horizontal axis, and means in the opposite ends of the tank affected by the change of the level of the mercury in the tank controlling the operation of said mechanism so that the operation of the latter will turn the carrier on its horizontal axis to return the sighting instrument to its initial horizontal position when displaced from the same by deviation of the unstable object.

6. In stabilizing apparatus for sighting instruments mounted on unstable objects, a support fixed to the unstable object, a rockable carrier for the sighting instrument pivoted on a horizontal axis to the support, an elongated tank containing mercury mounted on the support to assume the deviations of the unstable object, the longitudinal axis of the tank extending in the same direction as the longitudinal axis of the carrier, the mercury being free to flow to its normal level from one end of the tank to the other, and mechanism actuated by the change of level of the mercury in the tank for turning the rockable carrier on its horizontal axis to return the sighting instrument to its initial horizontal position when displaced from the same by deviation of the unstable object.

7. In stabilizing apparatus for sighting instruments mounted on unstable objects, a support fixed to the unstable object, a rockable carrier for the sighting instrument pivoted on a horizontal axis to the support, an elongated tank containing mercury mounted on the support to assume the deviations of the unstable object with the longitudinal axis of the tank extending in the same direction on the longitudinal axis of the carrier, the mercury being free to flow to its normal level from one end of the tank to the other, plungers in the opposite ends of the tank to be moved by the change of level of the mercury in the tank, and mechanism actuated by the moved plungers to tilt the carrier on its horizontal axis to return the sighting instrument to its initial horizontal position when displaced from the same by deviation of the unstable object.

8. In stabilizing apparatus for sighting instruments mounted on unstable objects, a support comprising a step fixed to the unstable object, an intermediate member pivotally mounted on the fixed step to rotate about a vertical axis, a rockable carrier for the sighting instrument pivoted to the intermediate member on a horizontal axis, the turning of the intermediate member on its vertical axis changing the horizontal direction of the carrier and the sighting instrument, an elongated tank containing mercury mounted on the intermediate member to assume the deviations of the unstable object with the longitudinal axis of the tank extending in the same direction as the longitudinal axis of the sighting instrument carrier and with the mercury free to flow to its normal level from one end of the tank to the other, mechanism mounted on the intermediate member for turning the carrier on its horizontal axis, and means in the opposite ends of the tank affected by the change of level of the mercury in the tank controlling the operation of said mechanism so that the operation of the latter will turn the carrier on its horizontal axis to return the sighting instrument to its initial horizontal position when displaced from the same by deviation of the unstable object.

9. In stabilizing apparatus for sighting instruments mounted on unstable objects, a support comprising a step fixed to the unstable object, an intermediate member pivotally mounted on the fixed step to rotate about a vertical axis, a rockable carrier for the sighting instrument pivoted to the intermediate member on a horizontal axis, the turning of the intermediate member on its vertical axis changing the horizontal direction of the carrier and the sighting instrument, an elongated tank containing mercury mounted on the intermediate member to assume the deviations of the unstable object with the longitudinal axis of the tank extending in the same direction as the longitudinal axis of the sighting instrument carrier and with the mercury free to flow to its normal level from one end of the tank to the other, mechanism mounted on the intermediate member for turning the carrier on its horizontal axis, and plungers in the opposite ends of the tank to be moved by the change of level in the tank to actuate said mechanism to tilt the carrier on its horizontal axis to return the sighting instrument to its initial horizontal position when displaced from the same by deviation of the unstable object.

10. In stabilizing apparatus for sighting instruments mounted on unstable objects, a support comprising a step fixed to the unstable object, an intermediate member pivotally mounted on the fixed step to rotate about a vertical axis, a rockable carrier for the sighting instrument pivoted to the intermediate member on a horizontal axis, the turning of the intermediate member on its vertical axis changing the horizontal direction of the carrier and the sighting instrument, an elongated tank containing mercury mounted on the intermediate member to assume the deviations of the unstable object with the longitudinal axis of the tank extending in the same direction as the longitudinal axis of the sighting instrument carrier and with the mercury free to flow to its normal level from one end of the tank to the other, a slide horizontally reciprocative on the intermediate member at right angles to the horizontal axis of the rockable carrier and having opposing cams engaging projections of the carrier on opposite sides of its horizontal axis so that the reciprocation of the slide will rock the carrier, a lever pivoted at one end to the intermediate member of the support and having a sliding engagement at the other end with the carrier, mechanism for oscillating said lever, and means in the opposite ends of the tank affected by the change of level of the mercury in the tank controlling the operation of the mechanism for oscillating the lever so that the oscillation of the latter will reciprocate the slide to turn the carrier on its horizontal axis to return the sighting instrument to its initial horizontal position when displaced from the same by deviation of the unstable object.

11. In stabilizing apparatus for sighting instruments mounted on unstable objects, a support comprising a step fixed to the unstable object, an intermediate member pivotally mounted on the fixed step to rotate about a vertical axis, a rockable carrier for the sighting instrument pivoted to the intermediate member on a horizontal axis, the turning of the intermediate member on its vertical axis changing the horizontal direction of the carrier and the sighting instrument, an elongated tank containing mercury mounted on the intermediate member to assume the deviations of the unstable object with the longitudinal axis of the tank extending in the same direction as the longitudinal axis of the sighting instrument carrier and with the mercury free to flow to its normal level from one end of the tank to the other, a slide horizontally reciprocative on the intermediate member at right angles to the horizontal axis of the rockable carrier and having opposing cams engaging projections of the carrier on opposite sides of its horizinal axis so that the reciprocation of the slide will rock the carrier, a lever pivoted at one end to the intermediate member of the support and having a sliding engagement at the other end with the carrier, a cross arm on the lever, plungers in opposite ends of the tank engaging the cross arm and actuated by the change of level of the mercury to oscillate the lever to reciprocate the slide to turn the carrier on its horizontal axis to return the sighting instrument to its initial position when displaced from the same by deviation of the unstable object.

12. In stabilizing apparatus for sighting instruments mounted on unstable objects, a rockable carrier supporting the sighting instrument pivoted on a vertical axis and an axis transverse to the vertical axis, a mercury bath mounted to have its level affected by a deviation from the horizontal by the unstable object, and mechanism directly actuated by the change of level in the mercury bath for turning the rockable carrier to return the sighting instrument to horizontal position when displaced therefrom by a deviation from the horizontal by the unstable object.

13. In stabilizing apparatus for sighting instruments mounted on unstable objects, a rockable carrier supporting the sighting instrument pivoted on a transverse axis, a mercury bath mounted to have its level affected by a deviation from the horizontal by the unstable object, mechanism for turning the rockable carrier, and plungers actuated by a change of level of the mercury bath for operating said mechanism to return the sighting instrument to horizontal position when displaced therefrom by a deviation from the horizontal by the unstable object.

In testimony whereof I have signed this specification.

VICTOR HONORÉ GODILLON.

Witnesses:
LOUIS GARDET,
MARCEL GUILLEMOT.